(12) United States Patent
Ishikawa et al.

(10) Patent No.: US 10,793,153 B2
(45) Date of Patent: Oct. 6, 2020

(54) VEHICLE CONTROLLER

(71) Applicant: HONDA MOTOR CO., LTD., Tokyo (JP)

(72) Inventors: Hisashi Ishikawa, Wako (JP); Kentaro Arai, Wako (JP); Masayuki Sadakiyo, Wako (JP); Takashi Adachi, Wako (JP); Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 16/233,486

(22) Filed: Dec. 27, 2018

(65) Prior Publication Data

US 2019/0202460 A1 Jul. 4, 2019

(30) Foreign Application Priority Data

Dec. 28, 2017 (JP) ................. 2017-254914

(51) Int. Cl.
*B60W 10/06* (2006.01)
*B60W 10/11* (2012.01)
*B60W 30/18* (2012.01)
*G05D 1/02* (2020.01)

(52) U.S. Cl.
CPC ............ *B60W 30/18* (2013.01); *B60W 10/06* (2013.01); *B60W 10/11* (2013.01); *G05D 1/0223* (2013.01); *B60W 2540/10* (2013.01); *B60W 2710/1005* (2013.01); *B60W 2720/106* (2013.01); *B60W 2900/00* (2013.01); *G05D 2201/0213* (2013.01)

(58) Field of Classification Search
CPC ...... B60W 10/04; B60W 10/06; B60W 10/11; B60W 30/02; B60W 30/14; B60W 30/18; B60W 2510/0604; B60W 2540/10; B60W 2710/1005
See application file for complete search history.

(56) References Cited

U.S. PATENT DOCUMENTS

| 8,078,380 B2* | 12/2011 | Sagisaka | F02D 11/105 123/350 |
| 2006/0006734 A1* | 1/2006 | Tabata | B60W 10/02 303/3 |
| 2012/0101676 A1* | 4/2012 | Ichioka | B60W 30/02 701/22 |
| 2012/0253616 A1* | 10/2012 | Halleberg | B60W 30/182 701/51 |

FOREIGN PATENT DOCUMENTS

| JP | 2003-200750 A | 7/2003 |
| JP | 2003-320868 A | 11/2003 |
| JP | 2017-146819 A | 8/2017 |

OTHER PUBLICATIONS

Office Action dated Dec. 10, 2019, issued in counterpart JP application No. 2017-254914, with English translation. (9 pages).
Office Action dated Jun. 4, 2019, issued in counterpart JP application No. 2017-254914, with English translation. (6 pages).

* cited by examiner

*Primary Examiner* — Edwin A Young
(74) *Attorney, Agent, or Firm* — Westerman, Hattori, Daniels & Adrian, LLP

(57) ABSTRACT

The vehicle controller performs gear position switch control in which a gear position of an automatic transmission set based on the automated drive control is changed to an upper-level gear position if the driver operates the accelerator pedal under the automated drive control.

6 Claims, 6 Drawing Sheets

FIG. 6

VEHICLE CONTROLLER

CROSS REFERENCES TO RELATED APPLICATIONS

The present application claims priority under 35 U.S.C. § 119 to Japanese Patent Application No. 2017-254914, filed Dec. 28, 2017, entitled "Vehicle Controller." The contents of this application are incorporated herein by reference in their entirety.

BACKGROUND

1. Field

The present disclosure relates to a vehicle controller, and more specifically to a vehicle controller configured to perform automated drive control that automatically controls at least one of acceleration/deceleration and steering of a host vehicle and a system including the vehicle controller.

2. Description of the Related Art

Conventionally, as disclosed in Japanese Unexamined Patent Application Publication No. 2017-146819, there is a vehicle controller including an automated drive control unit that automatically controls at least one of acceleration/deceleration and steering of a host vehicle so that the host vehicle can drive along a route to a destination.

In vehicle acceleration/deceleration control in the automated drive control as described above, a stepping operation of an accelerator pedal performed by a driver while a vehicle is traveling by automated driving is recognized to be the sign that the driver has an intention to change acceleration or deceleration of the vehicle in the automated drive control thus far. Therefore, in such a case, it seems to be desirable to reflect the driver's intention by appropriately adjust the acceleration or the deceleration of the vehicle according to the stepping operation of the accelerator pedal.

On the other hand, however, if the acceleration of the vehicle is changed according to the operation by the driver under the vehicle acceleration control in the automated drive control, the acceleration may sharply change to acceleration that largely differs from the vehicle acceleration based on the automated drive control thus far, which may lead to a trouble such as unstable behavior of the vehicle. Therefore, if the driver performs the stepping operation of the accelerator pedal during automated driving, it is necessary to appropriately adjust the acceleration while reflecting the appropriateness of the operation, a degree of the vehicle acceleration in the automated drive control thus far, and the like.

There is a need to provide a vehicle controller capable of reflecting a driver's intention on acceleration of a vehicle while suppressing a sharp change in the vehicle acceleration or the like, by appropriately adjusting the acceleration of the vehicle if the driver operates an accelerator pedal (accelerator operation member) while the vehicle is traveling by automated driving.

SUMMARY

The present application aims at solving the above-mentioned problems. In one aspect, the present application provides a vehicle controller including: an automated drive control unit that automatically controls at least acceleration/deceleration of a vehicle; an acceleration/deceleration change operation unit with which a driver of the vehicle performs an operation to change the acceleration/deceleration of the vehicle; an automatic transmission (TM) that varies a speed of a rotation caused by a driving force transmitted from a driving source (EG) of the vehicle to output the rotation to a drive wheel side; and a traveling control unit that outputs a traveling control command value including selection of a gear position set by the automatic transmission (TM). Here, the acceleration/deceleration change operation unit is an accelerator operation member for operating an accelerator position of the driving source (EG), the automatic transmission (TM) is a stepwise variable automatic transmission capable of setting a plurality of gear positions different in change gear ratio, and if the driver performs the operation of the accelerator operation member under the automated drive control, the traveling control unit performs gear position switch control in which the gear position of the automatic transmission set based on the automated drive control is changed to an upper-level gear position (gear position with a smaller change gear ratio).

According to the vehicle controller according to the present disclosure, if the driver performs the operation of the accelerator operation member under the automated drive control, the gear position switch control is performed in which the gear position of the automatic transmission set based on the automated drive control is changed to the upper-level gear position. Thus, it is possible to appropriately reflect a driver's intention on the acceleration of the vehicle, while suppressing a sharp change in the acceleration of the vehicle to stabilize behavior of the vehicle.

In addition, in the vehicle controller according to the present disclosure, it is preferable that the traveling control unit performs the gear position switch control if opening at the accelerator position set according to the operation of the accelerator operation member by the driver is smaller than the opening at the accelerator position set based on the automated drive control.

According to this configuration, if the opening at the accelerator position set according to the operation of the accelerator operation member by the driver is smaller than the opening at the accelerator position set based on the automated drive control, the operation of the driver is considered to be performed for some proper reason. Hence, it is determined that the accelerator position set according to the operation of the accelerator operation member by the driver is more appropriate to a current traveling condition of the vehicle. It is possible to suppress the sharp change in the acceleration of the vehicle according to a driver's request, by switching (upshifting) the gear position of the automatic transmission to the upper-level gear position based on the accelerator position according to the operation of the driver.

In addition, in the vehicle controller according to the present disclosure, it is preferable that the traveling control unit performs the gear position switch control if opening at the accelerator position set according to the operation of the accelerator operation member by the driver is larger than the opening at the accelerator position set based on the automated drive control.

According to this configuration, the gear position switch control is performed, if the opening at the accelerator position set according to the operation of the accelerator operation member by the driver is larger than the opening at the accelerator position set based on the automated drive control. Thus, even if the operation of the accelerator operation member by the driver is wrong, it is possible to suppress the sharp change in the acceleration of the vehicle by switching (upshifting) the gear position of the automatic transmission to the upper-level gear position.

In addition, in the vehicle controller according to the present disclosure, it is preferable that the traveling control unit does not perform the gear position switch control when the accelerator position set according to the operation exceeds a predetermined accelerator position, even if the driver operates the accelerator operation member under the automated drive control.

According to this configuration, if the accelerator position set according to the operation of the accelerator operation member by the driver is for full acceleration, it is determined that the driver operates the accelerator operation member for some reason. Thus, it is possible to change the acceleration of the vehicle based on the accelerator position according to the operation by the driver, by prohibiting switching (upshifting) of the gear position of the automatic transmission to the upper-level gear position. This allows for vehicle control that appropriately reflects the driver's intention.

In addition, in the vehicle controller according to the present disclosure, it is preferable that after the start of the gear position switch control, the traveling control unit switches the gear position of the automatic transmission to the gear position before the changing and terminates the gear position switch control when time elapsed after the operation of the acceleration/deceleration change operation unit is performed reaches predetermined time.

According to this configuration, after the start of the gear position switch control, it can be determined that a temporary request of the driver for the acceleration of the vehicle is cleared when the predetermined time elapses from the operation of the accelerator operation member performed by the driver. Thus, the gear position switch control is cancelled, and the gear position is returned to the normal gear position selected based on the automated gear shift control. This makes it possible to subsequently continue the normal automated drive control.

In addition, in the vehicle controller according to the present disclosure, it is preferable that in a case where opening at the accelerator position according to the operation of the accelerator operation member by the driver is large, the traveling control unit sets the predetermined time to shorter time than in a case where the opening at the accelerator position is small, and in the case where opening at the accelerator position according to the operation of the accelerator operation member by the driver is small, the traveling control unit sets the predetermined time to longer time than in the case where the opening at the accelerator position is large.

If the opening at the accelerator position according to the operation of the accelerator pedal by the driver is large (high), it is likely that the driver requests a rapid acceleration of the vehicle. Thus, it is desirable to ensure prompt acceleration of the vehicle by setting the predetermined time shorter and switching (returning) to a lower-level gear position more promptly. On the other hand, if the opening at the accelerator position according to the operation of the accelerator pedal by the driver is small (low), the acceleration based on the driver's request is low acceleration. Thus, there is less risk that even continuously keeping the gear position set at a high gear position results in a difference from the driver's intention. Therefore, it is possible to set the predetermined time to a longer time.

Note that above symbols in parenthesis represent drawing reference numbers of corresponding components in embodiments to be described below.

According to the vehicle controller according to the present disclosure, if the driver performs the stepping operation of the accelerator pedal while the vehicle is traveling under the automated drive control, it is possible to reflect the driver's intention on the acceleration of the vehicle while suppressing the sharp change in the acceleration of the vehicle to stabilize the behavior of the vehicle, by appropriately adjusting the acceleration of the vehicle. The word "unit" used in this application may mean a physical part or component of computer hardware or any device including a controller, a processor, a memory, etc., which are particularly configured to perform functions and steps disclosed in the application.

BRIEF DESCRIPTION OF THE DRAWINGS

FIG. 6 is a timing chart of the case where the driver performs the stepping operation of the accelerator pedal while the vehicle is traveling in the automated drive mode (case where the accelerator position according to the operation of the driver is for full acceleration).

DESCRIPTION OF THE PREFERRED EMBODIMENTS

Figure 1:
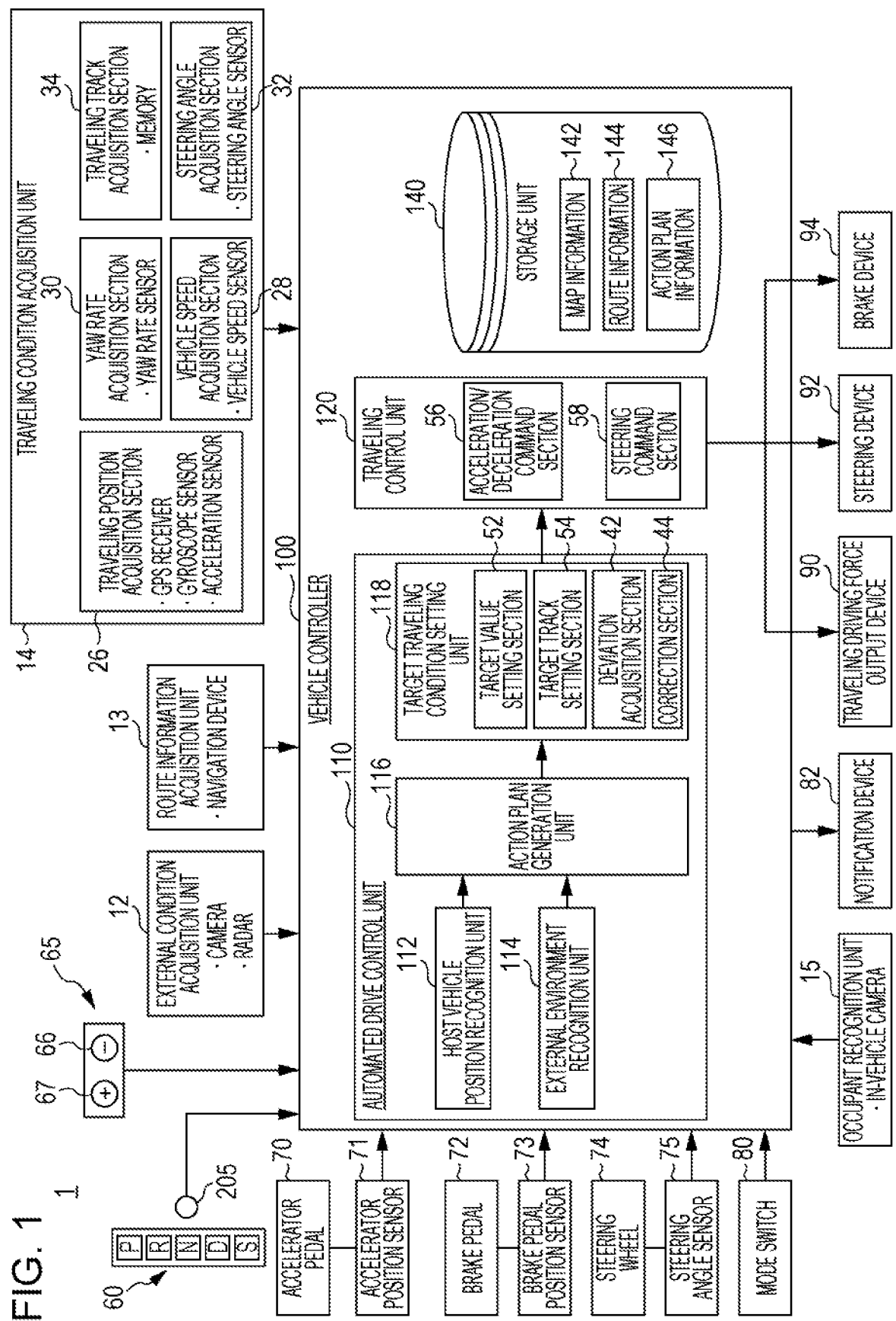
FIG. 1 is a functional configuration diagram of a system of controlling a vehicle including a vehicle controller of an embodiment of the present disclosure.

In the following, embodiments of the present disclosure are described with reference to the accompanying drawings. FIG. 1 is a functional configuration diagram of a system of controlling a vehicle 1 including a controller 100 mounted on the vehicle 1. A configuration of the controller 100 is described, using FIG. 1. The vehicle (host vehicle) 1 on which the controller 100 is mounted is, for example, an automobile such as a two-wheel, three-wheel, or four-wheel vehicle, and includes an automobile powered by an internal-combustion engine such as a diesel engine or a gasoline engine, an electric vehicle powered by an electric motor, a hybrid automobile combining the internal-combustion engine and the electric motor, or the like. In addition, the aforementioned electric vehicle is driven by using electric power discharged by a battery such as a secondary cell, a hydrogen fuel cell, a metal fuel cell, an alcohol fuel cell, or the like.

The controller 100 includes a device, such as an external condition acquisition unit 12, a route information acquisition unit 13, a traveling condition acquisition unit 14, or the like, for capturing various types of information from outside of the vehicle 1. The controller 100 also includes an operating device such as an accelerator pedal 70, a brake pedal 72, a steering wheel 74, and a mode switch 80; an operation detection sensor such as an accelerator position sensor 71, a brake pedal position sensor (brake switch) 73, and a steering angle sensor (or a steering torque sensor) 75; a notification device (output unit) 82; and an occupant recognition unit (in-car camera) 15. In addition, as a device for performing driving or steering of the vehicle 1, the vehicle 1 includes a traveling driving force output device (drive device) 90, a steering device 92, a brake device 94, as well as the controller 100 for controlling them. These devices or instruments are connected with each other via a multiplex communication line such as CAN (Controller Area Network), a serial communication line, a wireless communication network, or the like. Note that the operation devices exemplarily illustrated are merely an example, and that a button, a dial switch, a GUI (Graphical User Interface) switch, or the like may also be mounted on the vehicle 1.

The external condition acquisition unit 12 is configured to acquire environmental information around the vehicle such as external conditions of the vehicle 1, for example, a traffic lane on a traveling road or an object around the vehicle. The external condition acquisition unit 12 includes, for example, various types of cameras (monocular camera, stereo camera, infrared camera, or the like) or various types of radars (millimeter-wave radar, microwave radar, laser radar, or the like). In addition, a fusion sensor that integrates information acquired by a camera with that acquired by a radar can be used.

The route information acquisition unit 13 includes a navigation device. The navigation device has a GNSS (Global Navigation Satellite System) receiver or map information (navigation map), a touch-panel type display device that functions as a user interface, a speaker, a microphone, or the like. The navigation device identifies a position of the vehicle 1 by the GNSS receiver, and derives from that position a route to a destination specified by a user. The route derived by the navigation device is stored as route information 144 in a storage unit 140. The position of the vehicle 1 may be identified or complemented by an INS (Inertial Navigation System) that uses output from the traveling condition acquisition unit 14. The navigation device also gives a guidance on the route leading to the destination by voice or through navigation display when the controller 100 is performing a manual drive mode. Note that a configuration for identifying the position of the vehicle 1 may be provided independently of the navigation device. The navigation device may also be implemented by a function of terminal equipment such as a smart phone or a tablet terminal held by the user. In this case, information is transmitted and received between the terminal equipment and the controller 100 via wireless or wired communications.

The traveling condition acquisition unit 14 is configured to acquire a current traveling condition of the vehicle 1. The traveling condition acquisition unit 14 includes a traveling position acquisition section 26, a vehicle speed acquisition section 28, a yaw rate acquisition section 30, a steering angle acquisition section 32, and a traveling track acquisition section 34.

The traveling position acquisition section 26 is configured to acquire a traveling position and posture of the vehicle 1 (direction of movement), which is one of the traveling conditions. The traveling position acquisition section 26 includes various types of positioning devices such as a device (GPS receiver, GNSS receiver, beacon receiver, or the like) that receives an electromagnetic wave transmitted from a satellite or a road device, for example, to acquire positional information (latitude, longitude, altitude, coordinates, or the like), or a gyroscope sensor, or an acceleration sensor, or the like. The traveling position of the vehicle 1 is measured based on a specific region of the vehicle 1.

The vehicle speed acquisition section 28 is configured to acquire a speed of the vehicle 1 (referred to as a vehicle speed), which is one of the traveling conditions. The vehicle speed acquisition section 28 includes a speed sensor, or the like, provided on one or more wheels, for example.

The yaw rate acquisition section 30 is configured to acquire a yaw rate of the vehicle 1, which is one of the traveling conditions. The yaw rate acquisition section 30 includes a yaw rate sensor, or the like, for example.

The steering angle acquisition section 32 is configured to acquire a steering angle, which is one of the traveling conditions. The steering angle acquisition section 32 includes a steering angle sensor, or the like, provided on a steering shaft, for example. Here, a steering angle speed and steering angle acceleration are also acquired based on the acquired steering angle.

The traveling track acquisition section 34 is configured to acquire information on an actual traveling track (actual traveling track) of the vehicle 1, which is one of the traveling conditions. The actual traveling track includes a track (trajectory) on which the vehicle 1 actually traveled and may include a scheduled track on which the vehicle will travel from now, for example, an extension line on the front side of the direction of movement of the traveled track (trajectory). The traveling track acquisition section 34 includes a memory. The memory stores the positional information of a series of dot sequences included in the actual traveling track. In addition, the extension line can be predicted by a computer, or the like.

The accelerator position sensor 71, the brake pedal position sensor 73, the steering angle sensor 75, which are the operation detection sensor, output to the controller 100 accelerator position, a brake pedal position, and the steering angle as a detection result.

The mode switch 80 is a switch to be operated by an occupant of the vehicle 1. The mode switch 80 receives an operation of the occupant, and switches a drive mode (for example, an automated drive mode and the manual drive mode) based on content of the received operation. For example, from the content of the operation of the occupant, the mode switch 80 generates a drive mode specification signal that specifies the drive mode of the vehicle 1, and outputs it to the controller 100.

In addition, the vehicle 1 of the embodiment includes a shift device 60 to be operated by the driver via a shift lever. As shown in FIG. 1, positions of the shift lever (not shown) in the shift device 60 include P (parking), R (reverse travel), N (neutral), D (advance travel in an automatic gear shift mode (normal mode)), S (advance travel in a sports mode), or the like. A shift position sensor 205 is provided in the vicinity of the shift device 60. The shift position sensor 205 detects a position of the shift lever to be operated by the driver. Information on a shift position detected by the shift position sensor 205 is inputted to the controller 100. Note that in the manual drive mode, the information on the shift position detected by the shift position sensor 205 is directly outputted to a traveling driving force output device 90 (AT-ECU5).

In addition, the vehicle 1 of the present disclosure includes a paddle switch 65 provided in the vicinity of the steering wheel 74. The paddle switch 65 includes a—switch (minus button) 66 for instructing shift-down in a manual gear shift mode during the manual drive (manual drive mode) and a +switch (plus button) 67 for instructing shift-up in the manual gear shift mode. In the manual gear shift mode (manual mode) of an automatic transmission TM in the manual drive mode, operation signals of these minus button 66 and plus button 67 are outputted to the controller 100, and up-shift or down-shift of a gear position set by the automatic transmission TM according to the traveling condition of the vehicle 1 is performed. Note that in the embodiment, during the manual drive, if the driver operates any of the minus button 66 and the plus button 67 when the automatic gear shift mode is set and the shift lever is positioned in a D range or an S range, the automatic gear shift mode is switched to the manual gear shift mode (manual mode). In addition, during automated drive, a function (function which differs from that in the manual drive) to be described below in detail is given to the operation of the paddle switch 65.

The notification device 82 is various types of devices capable of outputting information. The notification device 82 outputs information for prompting the occupant of the vehicle 1 to shift from the automated drive mode to the manual drive mode. As the notification device 82, at least one of the speaker, a vibrator, the display device, and a light-emitting device, or the like, for example, is used.

The occupant recognition unit 15 includes the in-car camera capable of imaging interior of a passenger compartment of the vehicle 1, for example. The in-car camera may be, for example, a digital camera utilizing an individual image pickup device such as a CCD or a CMOS, or a near-infrared camera combined with a near-infrared light source. The controller 100 acquires an image shot by the in-car camera and can recognize a current driver of the vehicle 1 from an image of a face of the driver of the vehicle 1 included in the image.

Figure 2:
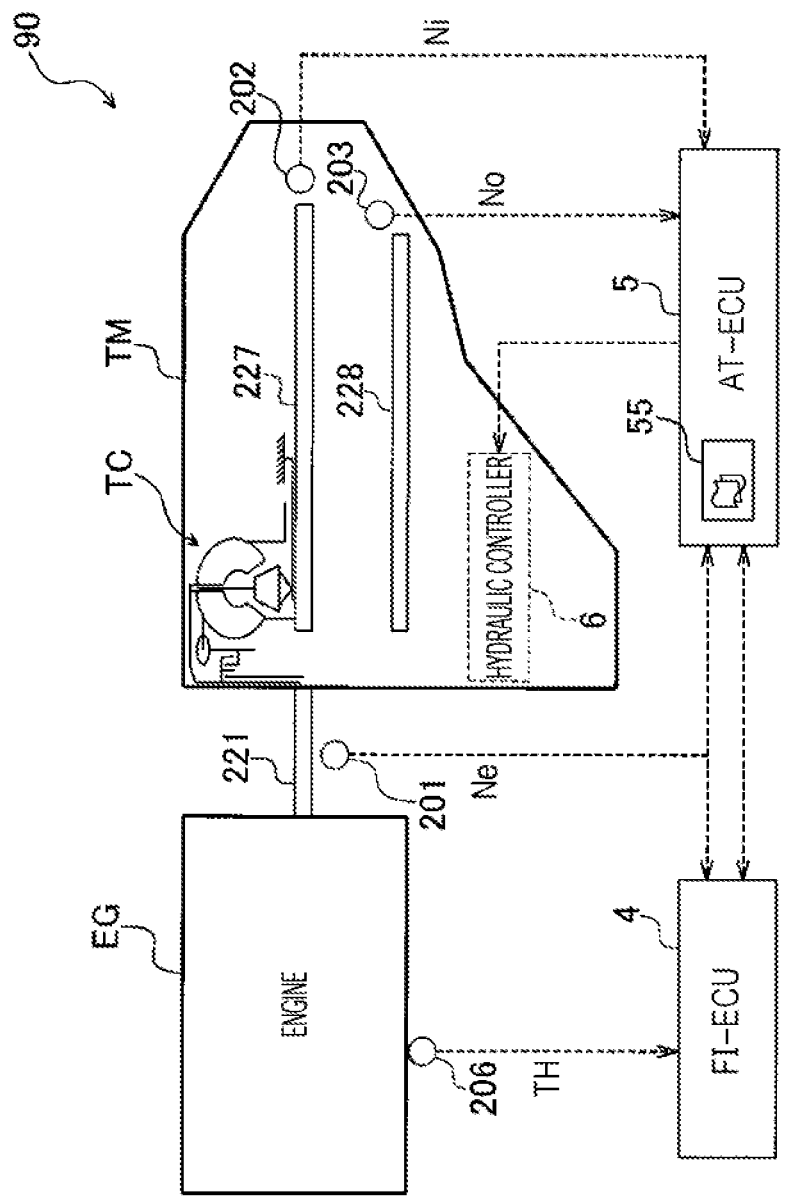
FIG. 2 is a schematic diagram illustrating a configuration of a traveling driving force output device (drive device) of the vehicle.

In the vehicle 1 of the embodiment, as shown in FIG. 2, the traveling driving force output device (drive device) 90 includes an engine EG, an FI-ECU (Electronic Control Unit) 4 that controls the engine EG, the automatic transmission TM, and the AT-ECU5 that controls the automatic transmission TM. Note that in addition to them, the traveling driving force output device 90 may also include a traction motor and a motor ECU that controls the traction motor, if the vehicle 1 is the electric vehicle powered by the electric motor. The traveling driving force output device 90 may also include the engine, the engine ECU, the traction motor, and the motor ECU, if the vehicle 1 is the hybrid automobile. If the traveling driving force output device 90 includes the engine EG and the automatic transmission TM, as in this embodiment, the FI-ECU 4 and the AT-ECU 5 control a throttle position of the engine EG or shift position of the automatic transmission TM, or the like, following information inputted from a traveling control unit 120, to be described below, and outputs traveling driving force (torque) for the vehicle 1 to travel. In addition, if the traveling driving force output device 90 includes the traction motor only, the motor ECU adjusts a duty ratio of a PWM signal to be provided to the traction motor, according to the information inputted from the traveling control unit 120, and outputs the aforementioned traveling driving force. In addition, the traveling driving force output device 90 includes the engine and the traction motor, both the FI-ECU and the motor ECU cooperate with each other to control the traveling driving force, according to the information inputted from the traveling control unit 120.

The steering device 92 includes the electric motor, for example. The electric motor causes a force to act on a rack-and-pinion mechanism to change orientation of a turning wheel. The steering device 92 drives the electric motor according to the information inputted from the traveling control unit 120 to change the orientation of the turning wheel.

The brake device 94 is an electric brake device including, for example, a brake caliper, a cylinder transmitting hydraulic pressure to the brake caliper, the electric motor for generating the hydraulic pressure in the cylinder, and a braking control unit. The braking control unit of the electric servo brake device controls the electric motor according to the information inputted from the traveling control unit 120, so that brake torque (braking force output device) that outputs a braking force according to a braking operation is outputted to each wheel. The electric servo brake device may include, as a backup, a mechanism for conveying the hydraulic pressure generated through the operation of the brake pedal 72 to the cylinder via a master cylinder. Note that the brake device 94 is not limited to the electric servo brake device as described above, and may be an electronically controlled brake device. The electronically controlled brake device controls an actuator according to the information inputted from the traveling control unit 120, and conveys the hydraulic pressure of the master cylinder to the cylinder. In addition, if the traveling driving force output device 90 includes the traction motor, the brake device 94 may include a regeneration brake by the traction motor.

Next, the controller 100 is described. The controller 100 includes an automated drive control unit 110, the traveling control unit 120, and the storage unit 140. The automated drive control unit 110 includes a host vehicle position recognition unit 112, an external environment recognition unit 114, an action plan generation unit 116, and a target traveling condition setting unit 118. Each unit of the automated drive control unit 110 and some or all of the traveling control unit 120 are implemented by a processor such as a CPU (Central Processing Unit), or the like executing a program. Some or all of them may also be implemented by hardware such as an LSI (Large Scale Integration) or an ASIC (Application Specific Integrated Circuit). In addition, the storage unit 140 is implemented by a ROM (Read Only Memory), a RAM (Random Access Memory), an HDD (Hard Disk Drive), or a flash memory, or the like. The program executed by the processor may be stored in advance in the storage unit 140 or downloaded from an external device via an onboard Internet equipment, or the like. The program may also be installed in the storage unit 140 by a portable storage medium which stores that program being attached to a drive device (not shown). In addition, the controller 100 may be distributed to a plurality of computer devices. This allows the aforementioned hardware functional units and software including the program, or the like, to work together on the on-board computer of the vehicle 1 to implement various types of processing in the embodiment.

The automated drive control unit 110 switches the drive mode according to input of the signal from the mode switch 80 to perform the control. The drive mode includes the drive mode (automated drive mode) that automatically controls acceleration/deceleration and steering of the vehicle 1, or the drive mode (manual drive mode) that controls the acceleration/deceleration of the vehicle 1 according to an operation on the operating device such as the accelerator pedal 70 or the brake pedal 72 and controls the steering according to the operation on the operating device such as the steering wheel 74, or the like. However, the drive mode is not limited thereto. Other drive modes may also include the drive mode (semi-automated drive mode) that automatically controls one of the acceleration/deceleration and the steering of the vehicle 1 and controls the other according to the operation on the operating device. Note that in the following description, "automated drive" includes the semi-automated drive mode, in addition to the automated drive mode described above.

Incidentally, under execution of the manual drive mode, the automated drive control unit 110 may stop the operation so that an input signal from the operation detection sensor is outputted to the traveling control unit 120 or directly supplied to the traveling driving force output device 90 (FI-ECU or AT-ECU), the steering device 92, or the brake device 94.

The host vehicle position recognition unit 112 of the automated drive control unit 110 recognizes the traffic lane (traveling lane) on which the vehicle 1 is traveling and a relative position of the vehicle 1 to the traveling lane, based on the map information 142 stored in the storage unit 140 and information inputted from the external condition acquisition unit 12, the route information acquisition unit 13, or the traveling condition acquisition unit 14. The map information 142 is, for example, the map information of higher precision than the navigation map the route information acquisition unit 13 has, and includes information on the center of the traffic lane or information on a border of the traffic lane. To be more specific, the map information 142 includes road information, traffic regulation information, address information (address/postal code), facility information, telephone number information, or the like. The road information includes information on a road type such as an expressway, a toll road, a national road, or a prefectural road, and information on the number of traffic lanes, width of each traffic lane, road inclination, a road position (three-dimensional coordinate including longitude, latitude, and altitude), curvature of a traffic lane curve, positions of merging and branching points of the traffic lane, signs provided on the road, or the like. The traffic regulation information includes information on traffic lane being blocked due to roadwork or a traffic accident, traffic jams, or the like.

The host vehicle position recognition unit 112 recognizes, as the relative position of the vehicle 1 to the traveling lane, deviation of a benchmark (center of gravity, for example) of the vehicle 1 from the center of the traveling lane, and an angle made to a centerline of the traveling lane in the direction of movement of the vehicle 1. Note that instead of this, the host vehicle position recognition unit 112 may recognize, as the relative position of the vehicle 1 to the traveling lane, apposition of the benchmark of the vehicle 1 to any side edge part of an own traffic lane.

The external environment recognition unit 114 recognizes such conditions as a position, a speed, acceleration, or the like of a surrounding vehicle, based on the information inputted from the external condition acquisition unit 12. The surrounding vehicle referred in this embodiment is other vehicle that travels around the vehicle 1, and the vehicle that travels in a same direction as the vehicle 1 does. The position of the surrounding vehicle may be represented by a representative point such as the center of gravity of the vehicle 1 or a corner, or may be represented by an area expressed by an outline of the vehicle 1. The "conditions" of the surrounding vehicle may include the acceleration of the surrounding vehicle, and whether or not it is changing the traffic lane (or is trying to change the traffic lane). In addition, the external environment recognition unit 114 may also recognize a position of a guardrail, a power pole, a parked vehicle, a passenger, or other object, in addition to the surrounding vehicle.

The action plan generation unit 116 sets a starting point of the automated drive, a scheduled end point of the automated drive, and/or a destination of the automated drive. The starting point of the automated drive may be a current position of the vehicle 1 or a spot where the occupant of the vehicle 1 performs an operation to instruct the automated drive. The action plan generation unit 116 generates an action plan in a section between the starting point and the scheduled end point or in a section between the starting point and the destination of the automated drive. Note that the action plan generation unit 116 is not limited thereto and may generate the action plan for any section.

The action plan may include a plurality of events that are sequentially performed, for example. The events include a deceleration event that decelerates the vehicle 1, an acceleration event that accelerates the vehicle 1, a lane-keep event that causes the vehicle 1 to travel so as not to deviate from the traveling lane, a lane-change event that changes the traveling lane, an overtake-event that causes the vehicle 1 to overtake a front traveling vehicle, a branch event that causes the vehicle 1 to change to a desired traffic lane at a branch point or to travel so as not to deviate from the current traveling lane, a merging event that causes the vehicle 1 to accelerate/decelerate in a merging lane for merging to a main lane and to change the traveling lane, or the like. For example, there exists a junction (branch point) in the toll road (expressway, or the like, for example), the controller 100 changes or keeps the traffic lane so that the vehicle 1 moves in a direction toward the destination. Therefore, if the action plan generation unit 116 refers to the map information 142 and finds out that the junction is present on the route, from the current position (coordinate) of the vehicle 1 till the position (coordinate) of the junction, the action plan generation unit 116 sets the lane-change event for changing the traffic line to a desired traffic lane on which the vehicle 1 can move to the direction toward the destination. Note that information showing the action plan generated by the action plan generation unit 116 is stored as action plan information 146 in the storage unit 140.

The target traveling condition setting unit 118 is configured to set a target traveling condition, which is a traveling condition targeted by the vehicle 1, based on the action plan determined by the action plan generation unit 116, and various types of information acquired from the external condition acquisition unit 12, the route information acquisition unit 13, and the traveling condition acquisition unit 14. The target traveling condition setting unit 118 includes a target value setting section 52 and a target track setting section 54. The target traveling condition setting unit 118 also includes a deviation acquisition section 42 and a correction section 44.

The target value setting section 52 is configured to set information on the traveling position (latitude, longitude, altitude, coordinates, or the like) targeted by the vehicle 1, information on a target value of the vehicle speed (which may be simply referred to as a target vehicle speed), and information on a target value of the yaw rate (which may be simply referred to as a target yaw rate). The target track setting section 54 is configured to set information on a target track of the vehicle 1 (which may be simply referred to as a target track) based on the external conditions acquired by the external condition acquisition unit 12 and the traveling route information acquired by the route information acquisition unit 13. The target track includes information on the target position per unit time. Each target position is associated with posture information (direction of movement) of the vehicle 1. In addition, each target position may be associated with the target value information such as the vehicle speed, the acceleration, the yaw rate, lateral acceleration G, the steering angle, steering angular speed, steering angular acceleration, or the like. The aforementioned target position, target vehicle speed, target yaw rate, and target track are information showing the target traveling condition.

The deviation acquisition section 42 is configured to acquire a deviation of an actual traveling condition to the target traveling condition, based on the target traveling condition set by the target traveling condition setting unit 118 and the actual traveling condition acquired by the traveling condition acquisition unit 14.

The correction section 44 is configured to correct the target traveling condition according to a deviation acquired by the deviation acquisition section 42. Specifically, as the deviation increases, the correction section 44 brings the target traveling condition set by the target traveling condition setting unit 118 close to the actual traveling condition acquired by the traveling condition acquisition unit 14 and sets a new target traveling condition.

The traveling control unit 120 is configured to control traveling of the vehicle 1. Specifically, the traveling control unit 120 outputs a command value for traveling control so that the traveling condition of the vehicle 1 equals or is brought close to the target traveling condition set by the target traveling condition setting unit 118 or the new target traveling condition set by the correction section 44. The traveling control unit 120 includes an acceleration/deceleration command section 56 and a steering command section 58.

The acceleration/deceleration command section 56 is configured to perform acceleration/deceleration control of the traveling control of the vehicle 1. Specifically, the acceleration/deceleration command section 56 computes an acceleration/deceleration command value so as to make the traveling condition of the vehicle 1 equal the target traveling condition, based on the target traveling condition (target acceleration/deceleration) and the actual traveling condition (actual acceleration/deceleration) which are set by the target traveling condition setting unit 118 or the correction section 44.

The steering command section 58 is configured to perform the steering control of the traveling control of the vehicle 1. Specifically, the steering command section 58 computes a steering angular speed command value so as to make the traveling condition of the vehicle 1 equal the target traveling condition, based on the target traveling condition and the actual traveling condition which are set by the target traveling condition setting unit 118 or the correction section 44.

FIG. 2 is a schematic diagram illustrating a configuration of the traveling driving force output device (drive device) 90 that the vehicle 1 includes. As shown in FIG. 2, the traveling driving force output device 90 of the vehicle 1 of the embodiment includes the internal-combustion engine (engine) EG, which is the driving source, and the automatic transmission TM connected to the engine EG via a torque converter TC with a lockup clutch. The automatic transmission TM is a transmission that varies the speed of the rotation caused by the driving force transmitted from the engine EG to output it to a drive wheel side, and is a stepwise variable automatic transmission capable of setting a plurality of gear positions for forward traveling and one gear position for reverse traveling. In addition, the traveling driving force output device 90 includes the FI-ECU (fuel injection controller) 4 that electronically controls the engine EG; the AT-ECU (automatic gear shift controller) 5 that automatically controls the automatic transmission TM including the torque converter TC; and a hydraulic controller 6 that hydraulically controls rotation driving or lockup control of the torque converter TC according to the control of AT-ECU5 and fastening (engagement)/release of a plurality of friction engagement mechanisms included in the automatic transmission TM.

Rotation output of the engine EG is outputted to a crankshaft (output shaft of the engine EG) 221, and conveyed to an input shaft 227 of the automatic transmission TM via the torque converter TC.

A crankshaft rotation speed sensor 201 for detecting a rotation speed Ne of the crankshaft 221 (engine EG) is provided. In addition, an input shaft rotation speed sensor 202 for detecting a rotation speed Ni of the input shaft 227 (input shaft rotation speed of the automatic transmission TM) is provided. In addition, an output shaft rotation speed sensor 203 for detecting a rotation speed No of the output shaft 228 (output shaft rotation speed of the automatic transmission TM) is provided. Vehicle speed data calculated from the rotation speed data Ne, Ni, No, and No detected by the respective sensors 201 to 203 is provided to the AT-ECU5. The engine rotation speed data Ne is also provided to the FI-ECU (fuel injection controller) 4. In addition, a throttle position sensor 206 for detecting throttle position TH of the engine EG is provided. Data on the throttle position TH is provided to the FI-ECU4.

In addition, AT-ECU 5 that controls the automatic transmission TM has a shift map (gear shift characteristics) 55 that defines areas for the gear positions settable by the automatic transmission TM, according to the vehicle speed detected by the vehicle speed sensor and the accelerator position detected by the accelerator position sensor 71. The shift map 55 includes an upshift line and downshift line set for each of the gear positions, and a plurality of types of shift maps having different characteristics are prepared in advance. In the gear shift control of the automatic transmission TM, the AT-ECU5 performs control to switch the gear positions of the automatic transmission TM according to the shift map selected from the plurality of types of shift maps.

[Overview of Automated Drive Control]

In the vehicle 1, if the automated drive mode is selected through the operation of the mode switch 80 by the driver, the automated drive control unit 110 performs the automated drive control of the vehicle 1. In the automated drive control, the automated drive control unit 110 understands the current traveling condition (actual traveling track or traveling position, or the like) of the vehicle 1 based on the information acquired from the external condition acquisition unit 12, the route information acquisition unit 13, the traveling condition acquisition unit 14, or the like, or the information recognized by the host vehicle position recognition unit 112 and the external environment recognition unit 114. The target traveling condition setting unit 118 sets the target traveling condition (target track or target position), which is the traveling condition targeted by the vehicle 1, based on the action plan generated by the action plan generation unit 116. The deviation acquisition section 42 acquires the deviation of the actual traveling condition relative to the target traveling condition. The traveling control unit 120 performs the traveling control so as to make the traveling condition of the vehicle 1 equal the target traveling condition or bring the traveling condition of the vehicle 1 close to the target traveling condition, if the deviation is acquired by the deviation acquisition section 42.

The correction section 44 corrects the target track or the target position based on the traveling position acquired by the traveling position acquisition section 26. The traveling control unit 120 performs the acceleration/deceleration control of the vehicle 1 by the traveling driving force output device 90 and the brake device 94, based on the vehicle speed, or the like, acquired by the vehicle speed acquisition section, so that the vehicle 1 follows a new target track or a new target position.

In addition, the correction section 44 corrects the target track based on the traveling position acquired by the traveling position acquisition section 26. The traveling control unit 120 controls the steering by the steering device 92, based on the steering angular speed acquired by the steering angle acquisition section 32, so that the vehicle 1 follows the new target track.

[Gear Position Switch Control During Automated Drive]

Then, the vehicle controller 100 of the vehicle 1 of the embodiment performs control (hereinafter referred to as "gear position switch control") in which the gear position of the automatic transmission TM set based on the automated drive control is changed to the upper-level gear position (gear position with a smaller change gear ratio) if the driver performs the operation (stepping operation) of the accelerator pedal 70 while the vehicle 1 is traveling under the afore-mentioned automated drive control. In the following, the gear position switch control is described.

Figure 3:
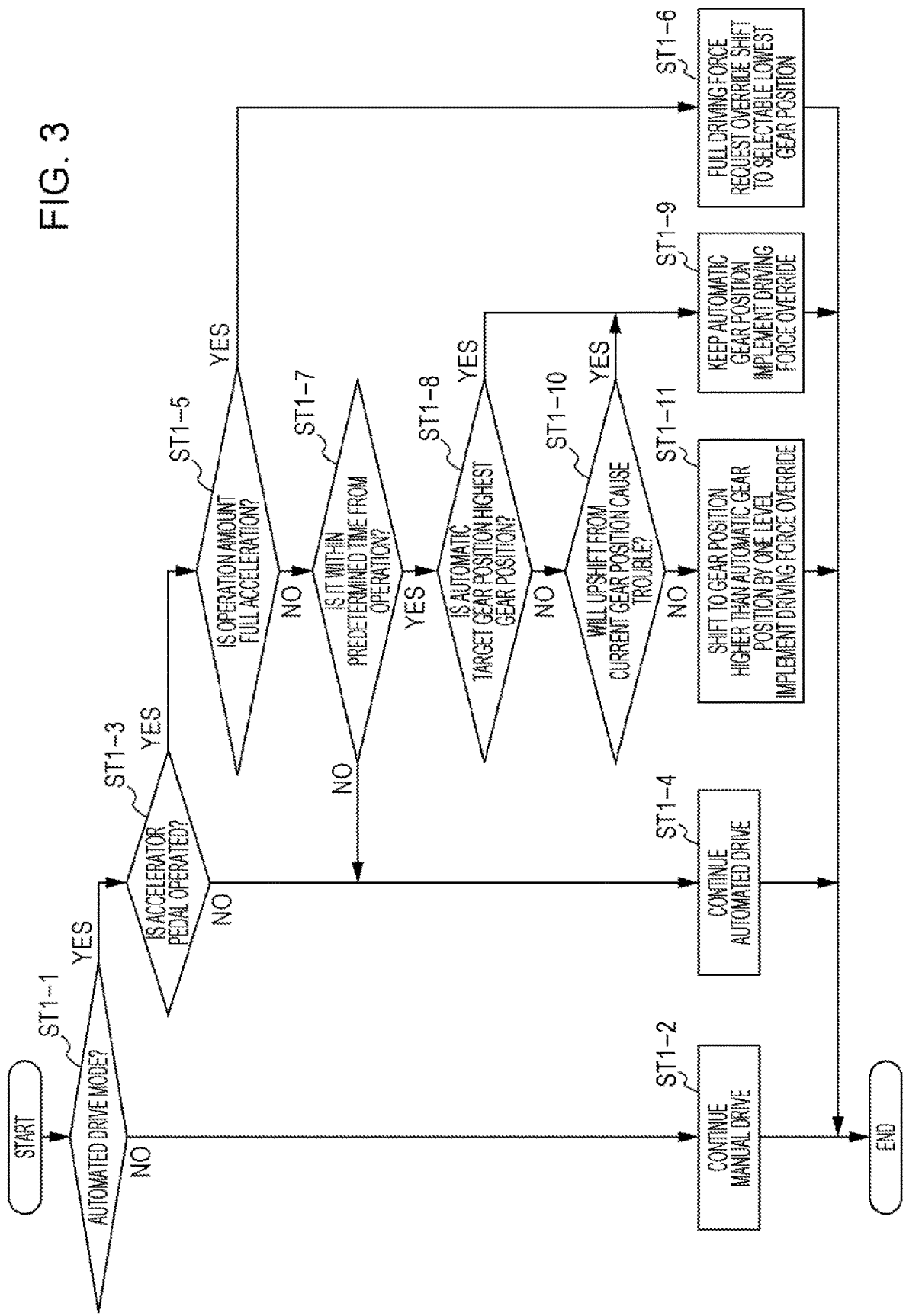
FIG. 3 is a flowchart for illustrating a procedure of gear position switch control.

FIG. 3 is a flowchart for illustrating a procedure of the gear position switch control. With reference to the flowchart of FIG. 3, the procedure of the gear position switch control is described. Here, first, it is determined whether or not the drive mode of the vehicle 1 is the automated drive mode (during automated drive control) (ST1-1). As a result, if the drive mode is not the automated drive mode (NO), more specifically, if it is the manual drive mode, the manual drive mode just continues (ST1-2). On the other hand, if the drive mode is the automated drive mode (YES), it is subsequently determined whether or not the driver of the vehicle 1 performs the stepping operation of the accelerator pedal 70 (ST1-3). As a result, if the driver does not perform the stepping operation of the accelerator pedal 70 (NO), the automated drive mode (control of the acceleration of the vehicle 1 based on the automated drive control) just continues (ST1-4). On the other hand, if the driver performs the stepping operation of the accelerator pedal 70 (YES), it is subsequently determined whether or not the accelerator position (operation amount) according to the stepping operation of the accelerator pedal 70 is for full acceleration (ST1-5). Note that the full acceleration at the accelerator position herein may include not only a case of actual full acceleration but also a case of acceleration assumed to be substantially full acceleration. As a result, if the accelerator position according to the stepping operation of the accelerator pedal 70 is for the full acceleration (YES), the full driving force request override is performed (ST1-6). In the full driving force request override, the lowest (with the largest gear change ratio) gear position that can be selected in the current traveling condition is selected as the gear position of the automatic transmission TM. This can provide the vehicle 1 with the appropriate driving force, and the rapid acceleration requested by the driver can be implemented. On the other hand, if the accelerator position according to the stepping operation of the accelerator pedal 70 is not for full acceleration in ST1-5 (NO), it is subsequently determined whether or not it is within the predetermined time from the stepping operation of the accelerator pedal 70 performed by the driver (ST1-7). As a result, if it is not within the predetermined time from the stepping operation of the accelerator pedal 70 performed by the driver (NO), more specifically, the predetermined time has already elapsed, the driver returns to the automated drive mode and continues the automated drive control (ST1-4). On the other hand, if it is within the predetermined time from the stepping operation of the accelerator pedal 70 performed by the driver (YES), it is subsequently determined whether or not the target gear position (automated target gear position) selected based on the automated drive control is the highest-level gear position (highest level)(ST1-8). As a result, if the target gear position in the automated drive control is the highest level (YES), selection of the target gear position that is selected based on the automated drive control is kept and the driving force override is implemented (ST1-9). On the other hand, if the target gear position in the automated drive control is not the highest level (NO), it is subsequently determined whether or not switching (upshifting) from the currently selected target gear position in the automated drive control to the upper-level gear position will cause a trouble (ST1-10). The trouble herein includes a case where a necessary rotation speed of the engine EG cannot be maintained if the switching from the current gear position to the upper-level gear position is performed; a case where vibrations or noise of the drive system of the vehicle 1 including the engine EG or the automatic transmission TM may increase; a case where power transmission efficiency of the drive system of the vehicle 1 including the engine EG or the automatic transmission TM may drop, or the like. As a result, if it is determined that the switching (upshifting) to the upper-level gear position will cause the trouble (YES), the selection of the target gear position selected based on the automated drive control is kept and the driving force override is performed (ST1-9). On the other hand, if it is determined that the switching (upshifting) to the upper-level gear position will not cause any trouble (NO), the driving override control is performed that switches the target gear position of the automatic transmission TM to the gear position which is one level higher than the target gear position set based on the automated drive control (ST1-11).

Figure 4:
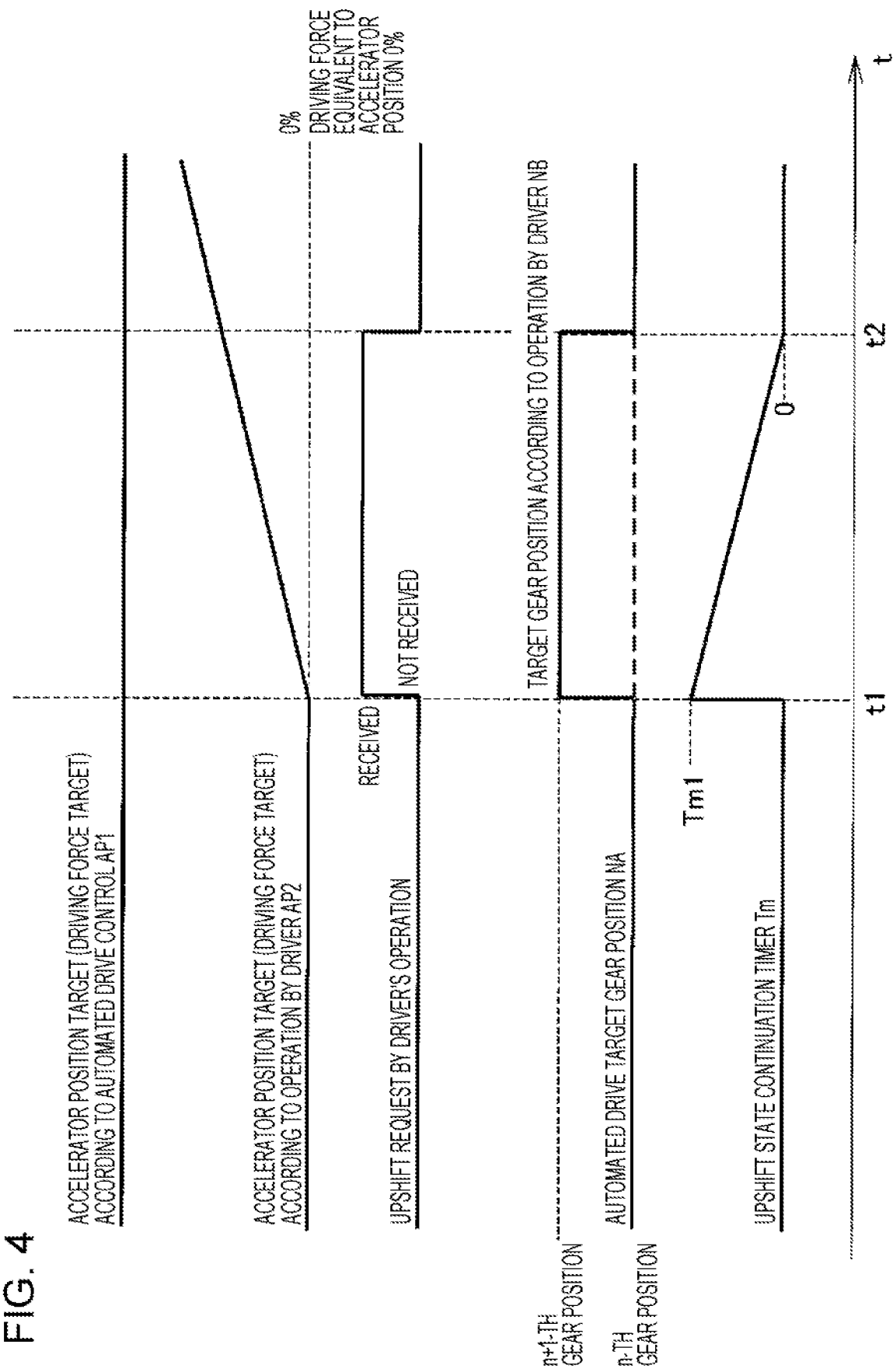
FIG. 4 is a timing chart of a case where a driver performs a stepping operation of an accelerator pedal while the vehicle is traveling in an automated drive mode (case where the opening at an accelerator position according to the operation of the driver is smaller than that at an accelerator position based on the automated drive control).
Figure 5:
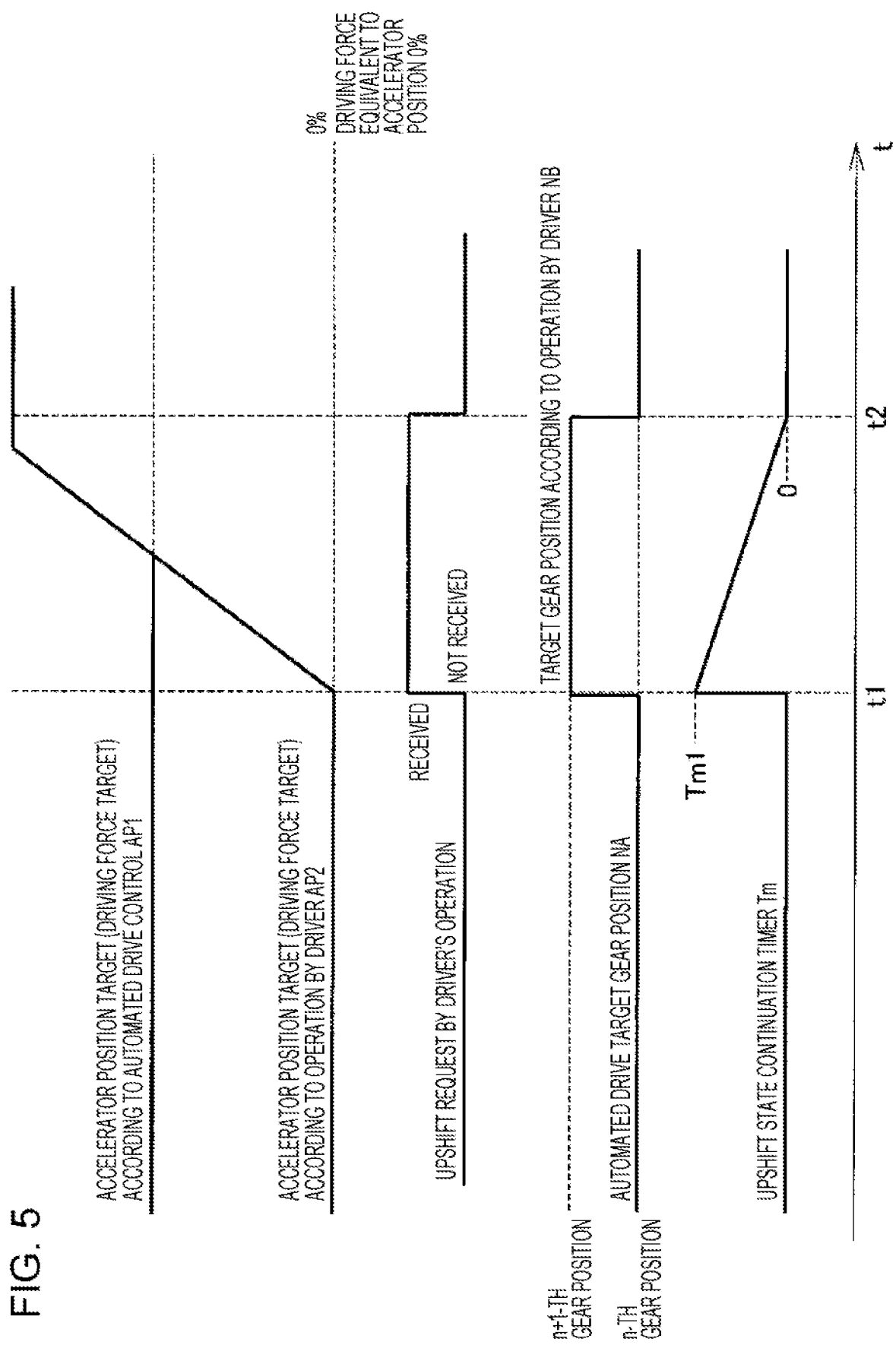
FIG. 5 is a timing chart of the case where the driver performs the stepping operation of the accelerator pedal while the vehicle is traveling in the automated drive mode (case where the opening at the accelerator position according to the operation of the driver is larger than that at the accelerator position based on the automated drive control).
Figure 6:
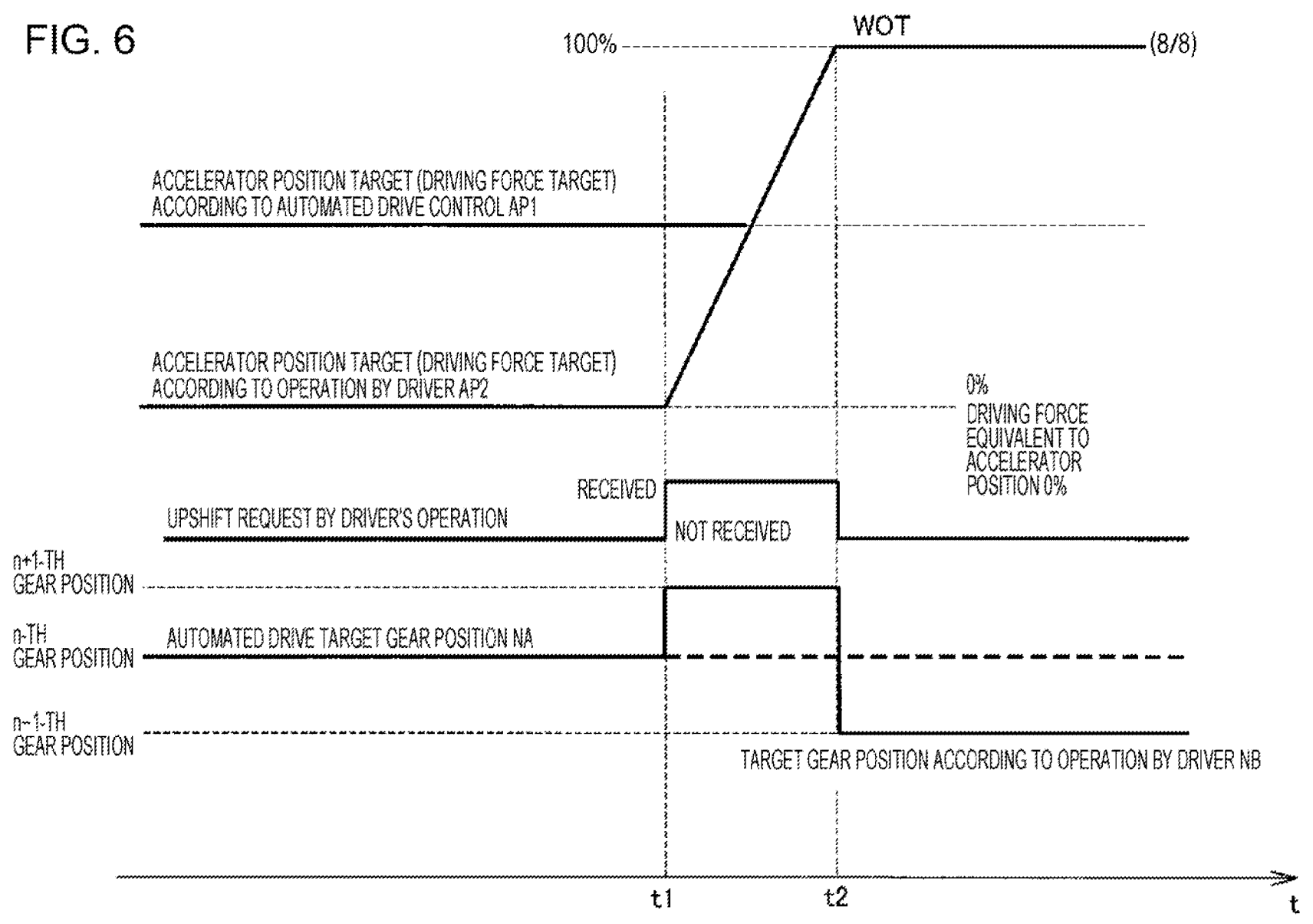

FIGS. 4 to 6 are a timing chart illustrating a change of each value in the gear position switch control of the case where the driver performs the stepping operation of the accelerator pedal 70 while the vehicle 1 is traveling in the automated drive mode. FIG. 4 shows the case where the opening at the accelerator position according to the operation of the accelerator pedal 70 by the driver is smaller (lower) than that at the accelerator position based on the automated drive control. FIG. 5 shows the case where the opening at the accelerator position according to the operation of the accelerator pedal 70 by the driver is larger (higher) than that at the accelerator position based on the automated drive control. FIG. 6 shows the case where the accelerator position according to the operation of the accelerator pedal 70 by the driver is for full acceleration. The timing charts of FIGS. 4 to 6 show a change over elapsed time t of each of a change in a target value (target value of the driving force) AP1 of the accelerator position based on the automated drive control, a target value of the accelerator position (target value of the driving force) AP2 according to the operation of the driver, the presence or absence of an upshift request by the driver's operation, the target gear position NA based on the automated drive control, the target gear position NB according to the stepping operation of the accelerator pedal 70 by the driver, and an upshift state continuation timer Tm.

In the case shown in FIG. 4 (case where the opening at the accelerator position AP2 according to the stepping operation of the accelerator pedal 70 by the driver is smaller (lower)

than the opening at the accelerator position AP1 based on the automated drive control), as the driver performs the stepping operation of the accelerator pedal 70 at the time t1 in a state in which the vehicle 1 is traveling in the automated drive mode (state in which the target gear position is selected based on the automated drive control), the target value (target value of the driving force) AP2 of the accelerator position according to the operation of the driver starts to increase from 0%. With this, the upshift request by the driver's operation is "received". Then, the target gear position of the automatic transmission TM is switched from the n-$^{th}$ gear position, which is the target gear position NA based on the automated drive control thus far, to the n+1-$^{th}$ gear position, which is the one-level-higher target gear position NB according to the stepping operation of the accelerator pedal 70 by the driver. In addition, at the time t1, the upshift state continuation timer Tm starts counting from an initial value Tm1. Then, in the case shown in FIG. 4, the target value (target value of the driving force) AP2 of the accelerator position according to the operation of the driver is always a value smaller (lower) than the target value (target value of the driving force) AP1 of the accelerator position based on the automated drive control, and AP2 never exceeds AP1. After that, at the time t2 where the predetermined time elapses, the upshift state continuation timer Tm becomes 0 (counts up), thus upshift request by the driver's operation is "not received". Then, the target gear position of the automatic transmission TM is switched again from the n+1-$^{th}$ gear position, which is the target gear position NB according to the stepping operation thus far of the accelerator pedal 70 by the driver, to the n-$^{th}$ gear position, which is the target gear position NA based on the original automated drive control.

As such, FIG. 4 shows the case where the opening at the accelerator position set according to the operation of the accelerator pedal 70 by the driver is smaller than that at the accelerator position set based on the automated drive control. As the driver in this case is considered to perform the operation for some proper reason, it is determined that the accelerator position set according to the operation of the accelerator pedal 70 by the driver is more appropriate to the current traveling condition of the vehicle 1 than otherwise. Thus, the gear position of the automatic transmission TM is switched (upshifted) to the upper-level gear position based on the accelerator position according to the operation of the driver. This can suppress the sharp change in the acceleration of the vehicle 1 according to the driver's request.

In addition, in the case shown in FIG. 5 (case where the opening at the accelerator position according to the stepping operation of the accelerator pedal 70 by the driver is larger (higher) than that at the accelerator position based on the automated drive control), as the driver performs the stepping operation of the accelerator pedal 70 at the time t1 in the state in which the vehicle 1 is traveling in the automated drive mode (state in which the target gear position is selected based on the automated drive control), the target value (target value of the driving force) AP2 of the accelerator position according to the operation of the driver start to increase from 0%. With this, the upshift request by the driver's operation is "received". Then, the target gear position of the automatic transmission TM is switched from the n-$^{th}$ gear position, which is the target gear position NA based on the automated drive control thus far, to the n+1-$^{th}$ gear position, which is the one-level-higher target gear position NB according to the stepping operation of the accelerator pedal 70 by the driver. In addition, at the time t1, the upshift state continuation timer Tm starts counting from an initial value Tm1. Then, in the case shown in FIG. 5, after that, and before the predetermined time elapses, the target value (target value of the driving force) AP2 of the accelerator position according to the operation of the driver becomes larger (higher) than the target value (target value of the driving force) AP1 of the accelerator position based on the automated drive control, and AP2 exceeds AP1. After that, at the time t2 where the predetermined time elapses from the stepping operation of the accelerator pedal 70 performed by the driver at the time t1, the upshift state continuation timer Tm becomes 0 (counts up), thus the upshift request by the driver's operation is "not received". Then, the target gear position of the automatic transmission TM is switched again from the n+1-$^{th}$ gear position, which is the target gear position NB according to the stepping operation thus far of the accelerator pedal 70 by the driver, to the n-$^{th}$ gear position, which is the target gear position NA based on the original automated drive control. In addition, the predetermined time till the timer Tm (t2-t1) shown in FIGS. 4 and 5 becomes 0 is set so that the predetermined time shown in the case of FIG. 4 is longer than that shown in the case of FIG. 5.

As such, in FIG. 5, if the opening at the accelerator position set according to the operation of the accelerator pedal 70 by the driver is larger than that at the accelerator position set based on the automated drive control, the gear position switch control is performed. Thus, even if the operation of the accelerator pedal 70 by the driver is wrong, it is possible to suppress the sharp change in the acceleration of the vehicle 1 by switching (upshifting) the gear position of the automatic transmission TM to the upper-level gear position.

In addition, in the case shown in FIG. 6 (case where the accelerator position according to the stepping operation of the accelerator pedal 70 by the driver is for full acceleration), as the driver performs the stepping operation of the accelerator pedal 70 at the time t1 in the state in which the vehicle 1 is traveling in the automated drive mode (state in which the target gear position is selected based on the automated drive control), the target value (target value of the driving force) AP2 of the accelerator position according to the driver starts to increase from 0%. With this, the upshift request by the driver's operation is "received". Then, the target gear position of the automatic transmission TM is switched from the n-$^{th}$ gear position, which is the target gear position NA based on the automated drive control thus far, to the n+1-$^{th}$ gear position, which is the one-level-higher target gear position NB according to the stepping operation of the accelerator pedal 70 by the driver. Then, in the case shown in FIG. 6, at the time t2, the target value (target value of the driving force) AP2 of the accelerator position according to the operation of the driver is full acceleration (WOT: Wide Open throttle). With this, the upshift request by the driver's operation is "not received". Then, the target gear position of the automatic transmission TM is switched from the n+1-$^{th}$ gear position, which is the target gear position NB according to the stepping operation thus far of the accelerator pedal 70 by the driver, to the n−1-$^{th}$ gear position, which is the one-level-lower gear position than the n-$^{th}$ gear position being the target gear position NA based on the original automated drive control. Here, the n−1-$^{th}$ gear position, which is the gear position switched here, is the lowest gear position that can be selected based on the traveling condition of the vehicle 1 at that time.

As such, in the case shown in FIG. 6, if the accelerator position set according to the operation of the accelerator pedal 70 by the driver is for full acceleration (WOT), it is determined that the driver operates the accelerator pedal 70 for some reason. Thus, the acceleration of the vehicle 1 is changed based on the accelerator position according to the operation by the driver, by prohibiting switching (upshifting) of the gear position of the automatic transmission TM to the upper-level gear position. This allows for the control of the vehicle 1 that appropriately reflects the driver's intention.

As described above, in the controller of the vehicle 1 of the embodiment, if the driver operates the accelerator pedal 70 while automated drive control is in place, the gear position switch control is performed in which the gear position of the automatic transmission TM set based on the automated drive control is changed to the upper-level gear position. This makes it possible to appropriately reflect the driver's intention on the acceleration of the vehicle 1 while suppressing the sharp change in the acceleration of the vehicle 1 to stabilize the behavior of the vehicle 1.

In addition, in the controller of the vehicle 1, after the start of the gear position switch control, the gear position of the automatic transmission TM is switched to the gear position before the changing and the gear position switch control is terminated when time elapsed after the operation of the accelerator pedal 70 is performed reaches predetermined time.

After the gear position switch control is performed, if the predetermined time elapses from the operation of the accelerator pedal 70 performed by the driver, it can be determined that a temporary request of the driver for the acceleration of the vehicle 1 is cleared. Thus, the gear position switch control is cancelled, and the gear position is returned to the normal gear position selected based on the automated gear shift control. This makes it possible to subsequently continue the normal automated drive control.

Also in this case, in the case where the opening at the accelerator position according to the operation of the accelerator pedal 70 by the driver is large, the predetermined time may be set shorter than in the case where the opening at the accelerator position is small. In the case where the opening at the accelerator position according to the operation of the accelerator pedal 70 by the driver is small, the predetermined time may be set longer than in the case where the opening at the accelerator position is large.

If the opening at the accelerator position according to the operation of the accelerator pedal by the driver is large (high), it is likely that the driver requests a rapid acceleration of the vehicle 1. Thus, it is desirable to ensure prompt acceleration of the vehicle 1 by setting the predetermined time shorter and switching (returning) to a lower-level gear position more promptly. On the other hand, if the opening at the accelerator position according to the operation of the accelerator pedal by the driver is small (low), the acceleration based on the driver's request is low acceleration. Thus, there is less risk that even continuously keeping the gear position set at a high gear position results in a difference from the driver's intention. Therefore, it is possible to set the predetermined time to a longer time.

So far the embodiments of the present disclosure have been described. However, the present disclosure is not limited to the embodiments described above, and various modifications are possible within the scope of the technical idea described in the claims, the specification, and the drawings. For example, the automated drive mode in implementing the gear position switch control as described above automatically controls both the steering angle and the acceleration/deceleration of the vehicle 1. In addition to this, however, the drive mode in implementing modification and control of the target acceleration may be a semi-automated drive mode that automatically controls only the acceleration/deceleration of the vehicle 1.

In addition, in the afore-mentioned embodiment, the gear position switch control during automated drive shows the case where the gear position of the automatic transmission TM is switched to the one-level-higher gear position, the gear position may be switched to the two-or-more-level-higher gear position.

In addition, in the afore-mentioned embodiment, the case is explained where it is determined if the gear position switch control is performed, based on the accelerator position according to the operation of the accelerator pedal 70 by the driver under the automated drive control. However, it may be determined if the gear position switch control is performed, based on the request driving force of the vehicle according to the operation of the accelerator pedal 70 or other operation member (paddle switch 65, for example) by the driver.

In addition, in the afore-mentioned embodiment, it is explained that even if the driver operates the accelerator pedal 70 under the automated drive control, the gear position switch control is not performed when the accelerator position set according to the operation is for full acceleration. In addition to this, however, under the control of the present disclosure, even though the accelerator position set according to the operation is for full acceleration, the gear position switch control may not be performed when the accelerator position exceeds a predetermined accelerator position.

What is claimed is:

1. A system of controlling a vehicle, comprising:
an acceleration/deceleration operation member configured to change an accelerator opening position for operating a driving source and to be operated by a driver of the vehicle to perform acceleration and deceleration of the vehicle;
a stepwise variable automatic transmission configured to vary a speed of a rotation caused by the driving force transmitted from the driving source of the vehicle to drive a drive wheel by setting a gear position among a plurality of different gear positions having different gear ratios; and
a vehicle controller comprising an automated drive control unit configured to automatically control at least the acceleration and deceleration of the vehicle by controlling the accelerator opening position and a traveling control unit configured to output a traveling control command value including selection of one of the gear positions such that the gear position of the automatic transmission is automatically set, wherein
when the driver operates the acceleration/deceleration operation member during the automated drive control being performed by the automated drive control unit, the traveling control unit changes the gear position of the automatic transmission which has been set based on the automated drive control to an upper-level gear position.

2. The system of controlling the vehicle controller according to claim 1, wherein
the traveling control unit changes the gear position of the automatic transmission set by the automated drive control to the upper-level gear position when the accelerator opening position set according to the acceleration/deceleration operation member operated by the driver is smaller than the accelerator opening position set based on the automated drive control.

3. The system of controlling the vehicle controller according to claim 1, wherein
the traveling control unit changes the gear position of the automatic transmission set by the automated drive control to the upper-level gear position when the accelerator opening position set according to the acceleration/deceleration operation member operated by the driver is larger than the accelerator opening position set based on the automated drive control.

4. The system of controlling the vehicle controller according to claim 1, wherein
the traveling control unit does not change the gear position of the automatic transmission set by the automated drive control to the upper-level gear position when the accelerator opening position set according to the operation of the acceleration/deceleration operation member exceeds a predetermined accelerator opening position, even when the driver operates the acceleration/deceleration operation member during the automated drive control.

5. The system of controlling the vehicle controller according to claim 1, wherein
following changing the gear position of the automatic transmission to the upper-level gear position by the traveling control unit, the traveling control unit changes the gear position back to the previous gear position when a predetermined time has elapsed after the acceleration/deceleration operation member is operated by the driver.

6. The system of controlling the vehicle controller according to claim 5, wherein
as the accelerator opening position according to the operation of the acceleration/deceleration operation member by the driver is larger, the traveling control unit sets the predetermined time to a shorter time, and
as the accelerator opening position according to the operation of the acceleration/deceleration operation member by the driver is smaller, the traveling control unit sets the predetermined time to a longer time.

* * * * *